United States Patent
Nien et al.

(10) Patent No.: US 10,971,110 B2
(45) Date of Patent: Apr. 6, 2021

(54) CIRCUIT AND METHOD FOR USE IN A FIRST DISPLAY DEVICE TO FACILITATE COMMUNICATION WITH A SECOND DISPLAY DEVICE, AND DISPLAY COMMUNICATION SYSTEM

(71) Applicant: NOVATEK MICROELECTRONICS CORP., Hsinchu (TW)

(72) Inventors: Chih-Peng Nien, Hsinchu (TW); Chien-Wen Lin, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 16/550,382

(22) Filed: Aug. 26, 2019

(65) Prior Publication Data

US 2021/0065650 A1 Mar. 4, 2021

(51) Int. Cl.
*G09G 5/00* (2006.01)
*G09G 5/14* (2006.01)
*H04N 7/10* (2006.01)

(52) U.S. Cl.
CPC .............. *G09G 5/006* (2013.01); *G09G 5/14* (2013.01); *H04N 7/102* (2013.01); *G09G 2370/12* (2013.01)

(58) Field of Classification Search
None
See application file for complete search history.

(56) References Cited

U.S. PATENT DOCUMENTS 9,197,023 B2* 11/2015 Bar-Niv ................. H01R 27/00
2017/0235357 A1* 8/2017 Leung ..................... G09G 5/00
713/310

* cited by examiner

Primary Examiner — Duane N Taylor, Jr.
(74) Attorney, Agent, or Firm — Schmeiser, Olsen & Watts, LLP

(57) ABSTRACT

A circuit for use in a first display device to facilitate communication with a second display device is provided. The first display device and the second display device each include a connector compliant with a digital display interface standard. The circuit includes a digital display interface circuit and a control unit. The digital display interface circuit is used for transmission or receiving of video data according to the digital display interface standard, the digital display interface circuit for being connected to the connector of the first display device. The control unit is configured to transmit at least one first communication signal through at least one first pin of the connector of the first display device to communicate with the second display device, wherein the at least one first communication signal is non-standard with respect to the digital display interface standard.

40 Claims, 6 Drawing Sheets

(PRIOA ART)

CIRCUIT AND METHOD FOR USE IN A FIRST DISPLAY DEVICE TO FACILITATE COMMUNICATION WITH A SECOND DISPLAY DEVICE, AND DISPLAY COMMUNICATION SYSTEM

BACKGROUND OF THE INVENTION

1. Field of the Invention

The present disclosure relates to communication technique for display devices, and in particular to a circuit and a method for use in a display device to facilitate communication and a display communication system.

2. Description of the Related Art

Electronic display devices are increasingly utilized in public areas, such as shopping malls, airports, sports arenas, hotel lobbies and so on, for public display applications. Such display devices may show content such as text, images, video or graphics, and the content may change over time (e.g., in a sequence of different advertisements).

For the public display applications, the display devices may be arranged in various manners. In an example, a star topology is employed where a number of display device are connected, via respective digital video cables, to a video distributor (or a video splitter) to which a video source is applied. In another topology such as daisy-chain arrangement, a number of display devices are connected in series with digital video cables, wherein a video source is applied to one of the serially-connected display devices.

In practical applications, the functionality of controlling or communicating with the display devices, such as turning on or off, setting parameters of at least one of the display devices, are required in addition to the video distribution among the display devices, as exemplified above. Auxiliary communication controllers, communication cables, and so on are needed for realization of controlling the display devices for public display applications. Referring to FIG. 1, two display devices 10 and 11 are connected through a digital video cable VA in a conventional arrangement for the video distribution when a video source is applied to the display device 10. In addition, the two display devices 10 and 11 in FIG. 1, which commonly support a communication standard, such as RS-232, are connected by way of a communication cable CA. In some implementations, a communication controller (e.g., for RS-232) may be required to connect to the display device 10. Supposing that the required number of the display devices to be connected in a daisy chain for public display applications is more than two, such 3, 5, 10, 20, 30 or above, the required number of cables is also increased. In this manner, such an approach increases the complexity of the deployment of the display devices. For instance, additional communication cables are required to be installed and maintained. The above problem also arises in an approach using a star topology.

BRIEF SUMMARY OF THE INVENTION

An objective of the present disclosure is to provide a communication technique which facilitates communication of a plurality of display devices via one or more video cables in a non-standard manner while video distribution may be performed between the display devices via the same cable(s) so as to simplify the topology of the connected display devices, wherein the video cable is compliant with a digital display interface standard which the display devices support.

To achieve at least the above objective, the present disclosure provides a display communication system comprising a first display device and a second display device. The first display device has a first connector compliant with a digital display interface standard, and being configured to transmit a communication signal through at least one first pin of the first connector, wherein the at least one first communication signal is non-standard with respect to the digital display interface standard. The second display device has a second connector compliant with the digital display interface standard, and capable of being connected to the first display device through the second connector, wherein the second display device is configured to receive the at least one first communication signal through at least one first pin of the second connector so as to communicate with the first display device.

To achieve at least the above objective, the present disclosure provides a circuit for use in a first display device to facilitate communication with a second display device, the first display device and the second display device each including a connector compliant with a digital display interface standard, the circuit comprising a digital display interface circuit and a control unit. The digital display interface circuit is used for transmission or receiving of video data according to the digital display interface standard, the digital display interface circuit for being connected to the connector of the first display device. The control unit is configured to transmit at least one first communication signal through at least one first pin of the connector of the first display device to communicate with the second display device, wherein the at least one first communication signal is non-standard with respect to the digital display interface standard.

In an embodiment, the digital display interface standard is a DisplayPort (DP) standard.

In some embodiments, the at least one first pin comprises at least one of CONFIG. 1 pin and CONFIG. 2 pin.

In an embodiment, the digital display interface standard is a HDMI standard.

In some embodiments, the at least one first pin comprises at least one of SCL pin and SDA pin.

In some embodiments, the at least one first communication signal is compliant with RS232 protocol.

In some embodiments, the control unit, or each of the first and second display devices correspondingly, configures the at least one first pin to be a UART TX/RX pin.

In some embodiments, the at least one first communication signal is compliant with I2C protocol.

In some embodiments, the control unit, or each of the first and second display devices correspondingly, configures the at least one first pin to be an I2C SDA/SCL pin.

In some embodiments, the at least one first communication signal is a TTL signal for transmitting a high state or a low stage.

In some embodiments, the control unit, or each of the first and second display devices correspondingly, configures the at least one first pin to be a GPIO control pin.

In some embodiments, the at least one first communication signal is a PWM signal.

In some embodiments, the control unit, or each of the first and second display devices correspondingly, configures the at least one first pin to be a PWM control pin.

In some embodiments, the control unit, or each of the first and second display devices correspondingly, configures the at least one first pin to be a specific pin compliant with a protocol with which the at least one first communication signal is compliant.

In some embodiments, the control unit or the first display device is further configured to transmit at least one second communication signal through at least one second pin of the connector of the first display device to communicate with the second display device, wherein the at least one second communication signal is compliant with the digital display interface standard.

In some embodiments, the control unit or the first display device is operable in one of a first mode and a second mode selectively; the control unit or the first display device in the first mode is configured so that the at least one first pin is compliant with the digital display interface standard; and the control unit or the first display device in the second mode is configured so that the at least one first pin transmits the at least one first communication signal.

In some embodiments, the control unit or the first display device in the second mode is capable of transmitting the at least one first communication signal to the second display so as to control the second display.

In some embodiments, the at least one first communication signal indicates at least one of identification information, power state information, and setting for video input interface associated the first display device under a daisy chain application.

To achieve at least the above objective, the present disclosure provides a method for use in a first display device to facilitate communication with a second display device, the first display device and the second display device each including a connector compliant with a digital display interface standard, the method comprising the following steps. (a) A digital display interface circuit provided for transmission or receiving of video data according to the digital display interface standard, the digital display interface circuit connected to the connector of the first display device. (b) A control unit is provided which is coupled to at least one first pin of the connector of the first display device to communicate with the second display device. (c) At least one first communication signal is transmitted by the control unit through the at least one first pin of the connector of the first display device to communicate with the second display device, wherein the at least one first communication signal is non-standard with respect to the digital display interface standard.

In some embodiments, the method may be applied to any one of the above embodiments.

In an embodiment, the method further comprises, before the step (c): configuring, by the control unit, the at least one first pin to be a specific pin compliant with a protocol with which the at least one first communication signal is compliant.

In an embodiment, the method further comprises: transmitting, by the control unit, at least one second communication signal through at least one second pin of the connector of the first display device to communicate with the second display device, wherein the at least one second communication signal is compliant with the digital display interface standard.

DETAILED DESCRIPTION OF THE INVENTION

To facilitate understanding of the object, characteristics and effects of this present disclosure, embodiments together with the attached drawings for the detailed description of the present disclosure are provided.

The following embodiments facilitate communication of a plurality of display devices via one or more video cables in a non-standard manner while video distribution may be performed between the display devices via the same cable(s), wherein the video cable is compliant with a digital display interface standard which the display devices support. Hence, the topology of the connected display devices can be simplified, and the complexity of deployment, installation and maintenance of the connected display devices can be also reduced.

Figure 2:
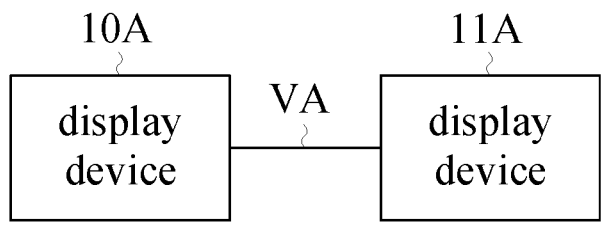
FIG. 2 is a schematic diagram illustrating a display communication system according to an embodiment of the invention.

Referring to FIG. 2, a display communication system is illustrated according to an embodiment of the invention. In FIG. 2, the display communication system includes display devices 10A and 11A, which are connected using a video cable, indicated by VA, compliant to a digital display interface standard (e.g., DisplayPort) which the display devices 10A and 11A support. The video cable VA is utilized to transmit at least one first communication signal, which is non-standard with respect to the digital display interface standard, for communication of the display devices 10A and 11A, in addition to signals (e.g., audio, video, and/or other signals) which are standard with respect to the digital display interface standard.

Figure 1:
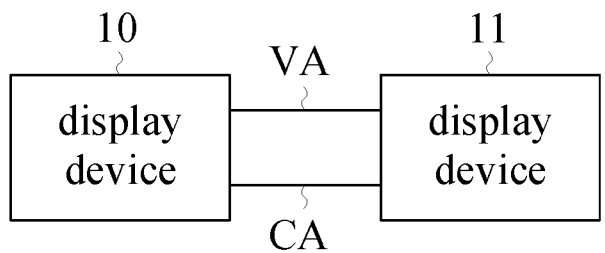
FIG. 1 (PRIOR ART) is a schematic diagram illustrating conventional communication between two display devices using a communication cable (CA) and a video data cable (VA).

Compared with FIG. 1 where two cables are required, the embodiment of FIG. 2 utilizes the same single video cable (e.g., VA) to transmit the signals compliant to a digital display interface standard and the at least one first communication signal which is non-standard with respect to the digital display interface standard, therefore reducing a total amount of cables required to connect different display devices.

In some embodiments, a plurality of pins of the single cable can be used according to a pin assignment defined by the digital display interface standard and the rest pins (unused or non-requisite pins in practical applications) of the single cable can be changed to transmit the at least one first communication signal in a non-standard manner with respect to the digital display interface standard. In other words, pins of the video cable can by utilized with more flexibility, not necessarily limited by the pin originally or conventionally defined by the digital display interface standard.

Figure 3:
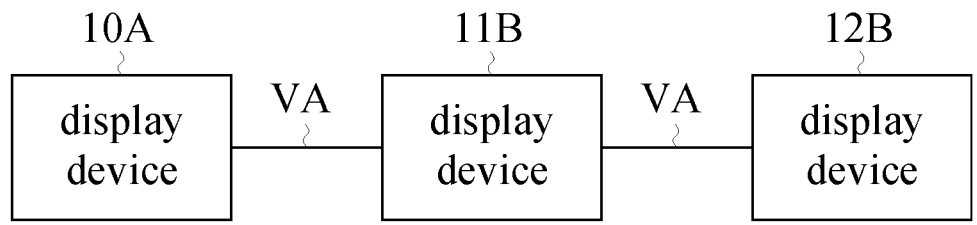
FIG. 3 is a schematic diagram illustrating a display communication system according to another embodiment of the invention.

The display communication system as shown in FIG. 2 can be further extended, for example, in a daisy-chain manner. FIG. 3 is a schematic diagram illustrating a display communication system according to another embodiment of the invention. In FIG. 3, the display communication system includes a plurality of display devices 10A, 11B, and 12B (or so on), which are connected using video cables VA compliant to the digital display interface standard (e.g., DisplayPort) which the display devices 10A, 11B, and 12B support. The video cable VA between two adjacent ones of the display devices transmits at least one first communication signal, which is non-standard with respect to the digital display interface standard, for communication of the two adjacent display devices (such as 10A and 11B, or 11B and 12B), in addition to signals which are standard with respect to the digital display interface standard.

In some embodiments, a plurality of display devices may be connected in any manners based on FIG. 2 or 3, or further with the aid of one or more video distribution devices, such as video splitters, video extenders, and so on, for public display applications while at least one first communication signal can be transmitted to the display devices via the video cables VA for control or management purpose.

The following embodiments are related to implementations of the display communication system by way of components of the display device.

Figure 4:
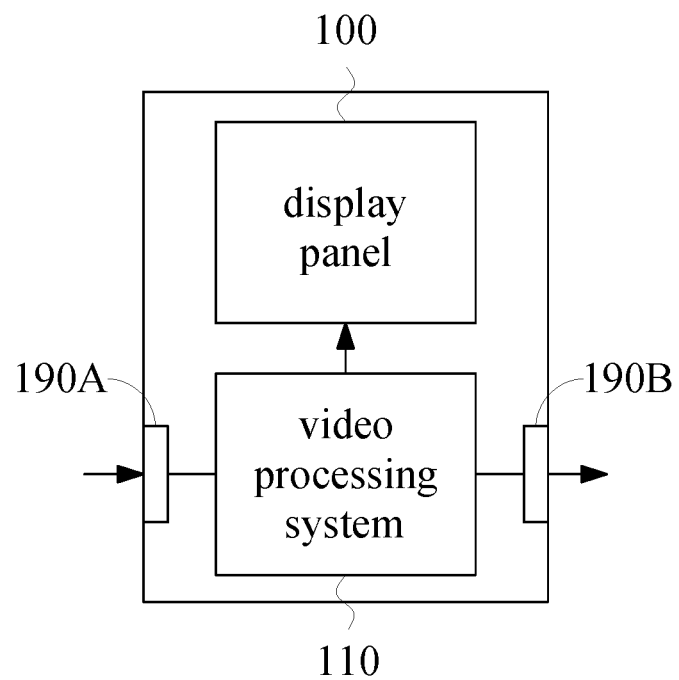
FIG. 4 is a block diagram illustrating a display device in FIG. 2 or 3 according to an embodiment.

In some embodiments, the display communication system as illustrated in FIG. 2 or 3 can be implemented with connectors. FIG. 4 illustrates a display device in FIG. 2 or 3 according to an embodiment. In FIG. 4, the display device 10A includes a display panel 100, a video processing system 110, and at least one connector, indicated by 190A or 190B, for example. The display panel 100 is electrically coupled to the video processing system 110. In some examples, the video processing system 110 may be electrically coupled to at least one connector, such as one or both of the connectors 190A and 190B. Based on the display structure of FIG. 4, for example, the display devices 10A and 11A of FIG. 2 each may have at least one connector. In another example based on FIG. 4, the display devices 10A and 12B of FIG. 3 each may have at least one connector while the display device 11B of FIG. 3 may have at least two connectors.

In some embodiments, a display communication system includes a plurality of display device which includes a first display device and a second display device, based on FIG. 4. The first and second display devices (e.g., 10A, 11A, 10A, 11B or 12B) each have a connector 190 compliant with a digital display interface standard (e.g., DisplayPort). The first display device (e.g., 10A) is configured to transmit at least one first communication signal through at least one first pin of the connector 190, wherein the at least one first communication signal is non-standard with respect to the digital display interface standard. The second display device (e.g., 11A or 11B) is capable of being connected to the first display device (e.g., 10A) through the connector 190 of the second display device. The second display device is configured to receive the at least one first communication signal through at least one first pin of the connector 190 of the second display device so as to communicate with the first display device. In similar manners, any twos of the display devices of the display communication system may communicate. In some examples for control or management purpose, the communication signal may be broadcast to each of the display devices or the communication signal may be destined to at least a specific one of the display devices by way of addressing.

Figure 5:
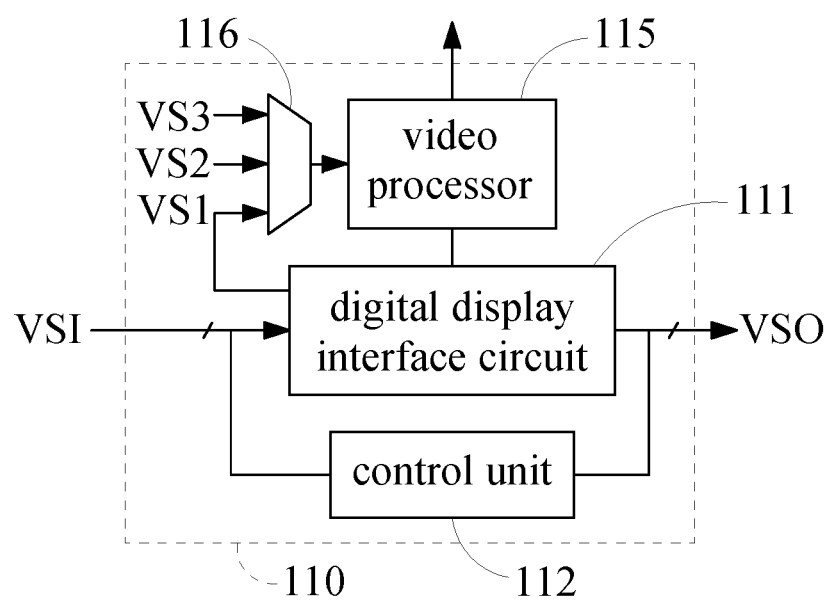
FIG. 5 is a block diagram illustrating an embodiment of the video processing system of FIG. 4.

Referring to FIG. 5, an embodiment of the video processing system 110 of FIG. 4 is illustrated. In FIG. 5, the video processing system 110 includes a digital display interface circuit 111, a control unit 112, a video processor 115, and a video multiplexer 116. The video multiplexer 116 selects one from a number of video source signals, indicated by VS1, VS2, VS3, for example, which may be provided by external or internal sources, and the video processor 115 processes the selected video source signal and outputs associated panel driving signals for driving the display panel 100. In an example regarding a daisy chain application, the digital display interface circuit 111 is used to receive input video signals VSI (e.g., video signals of DisplayPort) from the connector 190A and transmit output video signals VSO to another display device through another connector 190B for video distribution. For display purpose, the digital display interface circuit 111 receives the input video signals VSI and accordingly outputs received video signals as the video source signal VS1 to the video multiplexer 116. In some examples, the video source signals VS2 or VS3 may be provided by another display interface circuit compliant with another interface standard or a video source from a digital television tuner. Certainly, the implementation of the display communication system is not limited to the above examples.

Figure 6:
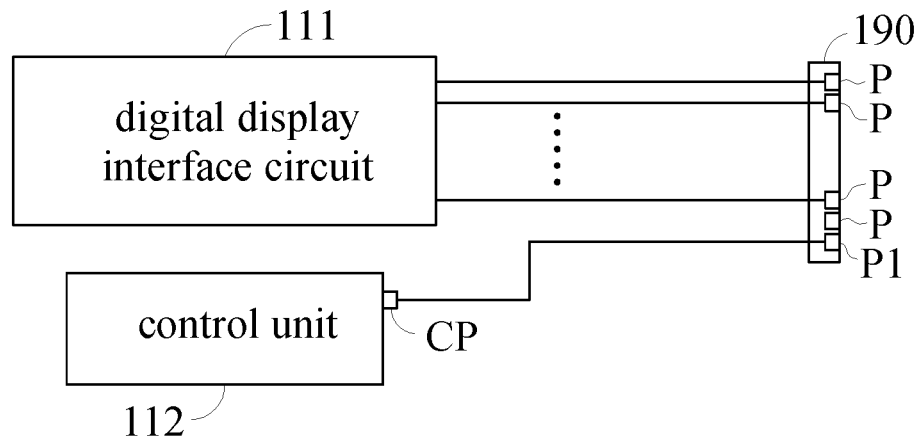
FIG. 6 is a block diagram illustrating a circuit for use in the first display device to facilitate communication with the second display device according to an embodiment.

In some embodiments, the display communication system as illustrated in FIG. 2 or 3 can be implemented by using a circuit for use in the display device. FIG. 6 illustrates a circuit for use in the display device to facilitate communication of display devices according to an embodiment. In FIG. 6, a connector 190 is illustrated by a schematic diagram with a number of pins (indicated by P and P1), wherein other details such as contacts, electrical components or housing of the connector 190 compliant to the digital display interface standard are not shown for the sake of brevity.

In FIG. 6, a circuit for use in a first display device is provided to facilitate communication with a second display device. The first display device and the second display device (e.g., 10A and 11A of FIG. 2; 10A and 11B of FIG. 3; or 11B and 12B) each include a corresponding connector 190 (such as 190A or 190B where appropriate) compliant with a digital display interface standard (e.g., DisplayPort). The circuit includes a digital display interface circuit 111 and a control unit 112. The digital display interface circuit 111 is used for transmitting or receiving of video data according to the digital display interface standard, and the digital display interface circuit 111 is configured for being connected to the connector 190 of the first display device. The control unit 112 is configured to transmit at least one first communication signal through at least one first pin (e.g., a pin P1 as indicated in FIG. 6) of the connector 190 of the first display device to communicate with the second display device, wherein the at least one first communication signal is non-standard with respect to the digital display interface standard.

For communication and video distribution, the circuit including the digital display interface circuit 111 and control unit 112 as shown in FIG. 6 is provided for use in the first display device, as illustrated in FIGS. 4 and 5, for the communication with the second display device. For the communication with the first display device, the second display device may employ a circuit including a digital display interface circuit 111 and a control unit 112, such as the same as, similar to, or based on that shown in FIG. 6.

In the embodiment of FIG. 6, the circuit for use in the first display device is provided to facilitate communication with the second display device. If the circuit is employed in the first display device, on one hand, the digital display interface circuit 111 is electrically coupled or connected to a portion of the pins (e.g., indicated by a number of P) of the connector 190 so as to operate compliant with the digital display interface standard. On the other hand, the control unit 112 is electrically coupled or connected to at least one of the pins, indicated by P1, of the connector 190 so as to operate in a non-standard manner with respect to the digital display interface standard.

Figure 7:
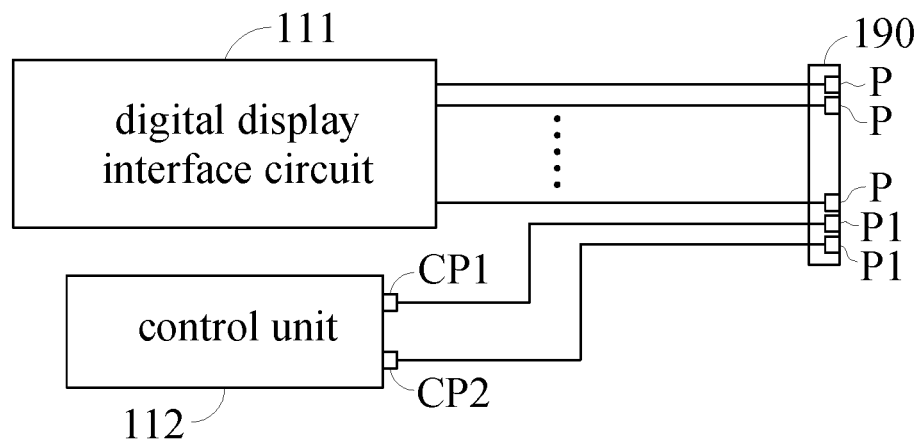
FIG. 7 is a block diagram illustrating a circuit for use in the first display device to facilitate communication with the second display device according to another embodiment.

Referring to FIG. 7, another embodiment of the circuit based on FIG. 6 is illustrated. In the circuit of FIG. 7, the control unit 112 is electrically coupled or connected to at least two of the pins, indicated by P1, of the connector 190 so as to operate in a non-standard manner with respect to the digital display interface standard.

Figure 8:
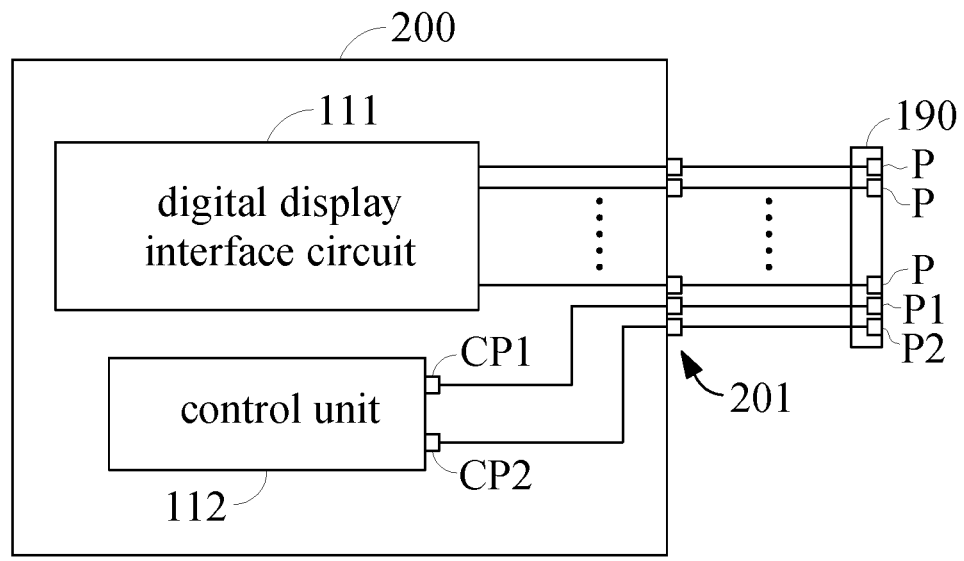
FIG. 8 is a block diagram illustrating a circuit for use in the first display device to facilitate communication with the second display device according to an embodiment.

In FIG. 6 or 7, the circuit may be implemented by separate chips or integrated circuits realizing the digital display interface circuit 111 and control unit 112. The circuit of FIG. 6 or 7 may be implemented as an integrated circuit or as a portion of an integrated circuit. FIG. 8 illustrates that a circuit 200, which may be based on or similar to that of FIG. 6 or 7, can be implemented as an integrated circuit having a plurality of pins 201 for being electrically coupled to the corresponding pins of the connector 190. In some embodiments, the circuit 200 may include additional components or be implemented as an integrated circuit including a portion of or entire of the video processing system 110, as exemplified in FIG. 5.

It is also noted that the first pin(s) of the connector 190 is shown in FIG. 6, 7, or 8 for the sake of illustration only, regardless of order or position of the pin(s), pinout type or pinout assignment of the first pin(s) of the connector 190. In practical applications, the first pin(s) may be selected from the pins of the connector 190, where appropriate with respect to the digital display interface standard. Preferably but not limitedly, the first pin(s) may be selected from unused or non-requisite pins according to the pinout assignment defined by the digital display interface standard. In other words, pins of the connector 190 can by utilized with more flexibility, not necessarily limited by the pinout assignment originally or conventionally defined by the digital display interface standard.

Figure 9:
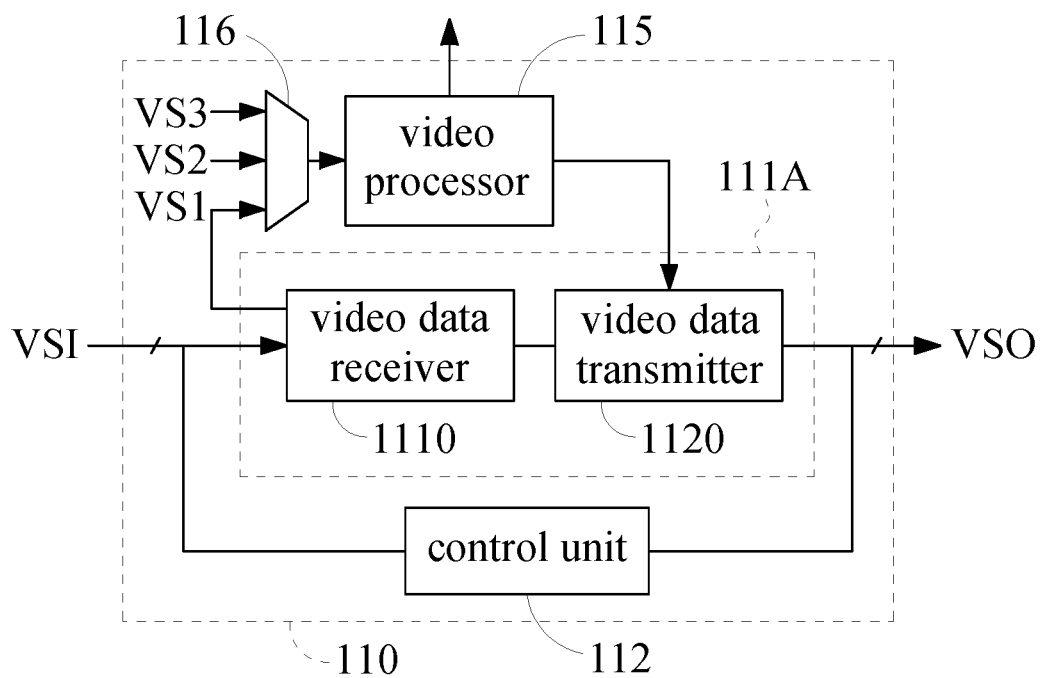
FIG. 9 is a block diagram illustrating an embodiment of the digital display interface circuit.

Referring to FIG. 9, an embodiment of the digital display interface circuit is illustrated. In FIG. 9, the digital display interface circuit 111A, which is an embodiment of the digital display interface circuit 111, includes a video data receiver 1110 and a video data transmitter 1120. Referring to FIGS. 4 and 9, the video data receiver 1110 is used for receiving video data according to the digital display interface standard. The video data transmitter 1120 is used for transmission of video data according to the digital display interface standard. In some embodiments, the digital display interface circuit 111 of the circuit of FIG. 6, 7, or 8 or any circuit based on or similar to of FIG. 6, 7, or 8, may include the video data receiver 1110 or video data transmitter 1120 in FIG. 9 or both of them, where appropriate. For example, for the implementation of the scenario as illustrated in FIG. 3, the display device 10A may utilize a digital display interface circuit 111 including a video data transmitter 1120; the display device 11B may utilize a digital display interface circuit 111 including a video data receiver 1110 and a video data transmitter 1120; the display device 12B may utilize a digital display interface circuit 111 including a video data receiver 1110. Certainly, the implementation of the display communication system is not limited to the above examples.

The following provides some embodiments each of or any combination of which may be applied to, where appropriate, any one or combination of the above embodiments regarding the display communication system (e.g., FIG. 1 or 2) or the circuit for use in a first display device to facilitate communication with a second display device (e.g., FIG. 5, 6, 7, 8 or 9).

In an embodiment, the digital display interface standard is a DisplayPort (DP) standard (e.g., DP version 1.2 or above). The original or conventional pinout assignment of a DisplayPort connector at a source side is listed in TABLE 1.

TABLE 1

DisplayPort connector (source-side)

| Pin No. | Signal Type | Signal assignment |
| --- | --- | --- |
| Pin 1 | ML_Lane 0 (p) | Lane 0 (positive) |
| Pin 2 | GND | Ground |
| Pin 3 | ML_Lane 0 (n) | Lane 0 (negative) |
| Pin 4 | ML_Lane 1 (p) | Lane 1 (positive) |
| Pin 5 | GND | Ground |
| Pin 6 | ML_Lane 1 (n) | Lane 1 (negative) |
| Pin 7 | ML_Lane 2 (p) | Lane 2 (positive) |
| Pin 8 | GND | Ground |
| Pin 9 | ML_Lane 2 (n) | Lane 2 (negative) |
| Pin 10 | ML_Lane 3 (p) | Lane 3 (positive) |
| Pin 11 | GND | Ground |
| Pin 12 | ML_Lane 3 (n) | Lane 3 (negative) |
| Pin 13 | CONFIG1 | Connected to ground |
| Pin 14 | CONFIG2 | Connected to ground |
| Pin 15 | AUX CH (p) | Auxiliary channel (positive) |
| Pin 16 | GND | Ground |
| Pin 17 | AUX CH (n) | Auxiliary channel (negative) |
| Pin 18 | Hot plug | Hot plug detect |
| Pin 19 | Return | Return for power |
| Pin 20 | DP_PWR | Power for connector (3.3 V 500 mA) |

In a specific application of the DisplayPort standard, pins 13 and 14 can be utilized to determine whether power is provided through the connector. In a standard DisplayPort application, pins 13 and 14 may either be directly connected to ground or connected to ground through a pulldown device. While TABLE 1 is the pinout assignment for source-side connector, the sink-side connector pinout will have lanes 0-3 reversed in order; i.e., lane 3 will be on pin 1(n) and 3(p) while lane 0 will be on pin 10(n) and 12(p); but the other pinout remains unchanged. In other words, pins 13 and 14 may not be used or requisite in practical applications.

In some embodiments, the at least one first pin (e.g., P1 as exemplified in any one of FIGS. 6-8) includes at least one of CONFIG. 1 pin (or pin 13) and CONFIG. 2 pin (or pin 14), i.e., either one or both of CONFIG. 1 pin and CONFIG. 2 pin before the two pins are unused or non-requisite pints. For example, the control unit 112 has at least one pin (indicated by CP, CP1 or CP2 in FIGS. 6-8) electrically coupled to at least one of CONFIG. 1 pin (or pin 13) and CONFIG. 2 pin (or pin 14). The CONFIG. 1 pin and CONFIG. 2 pin may be used for bi-directional communication. Certainly, the implementation of the display communication system and the circuit is not limited to the above examples.

In an embodiment, the digital display interface standard is a High-Definition Multimedia Interface (HDMI) standard. The pinout assignment of a HDMI type A connector (receptable) is listed in TABLE 2.

TABLE 2

| HDMI type A receptacle | |
| --- | --- |
| Pin 1 | TMDS Data2+ (Transition-minimized differential signaling, TMDS) |
| Pin 2 | TMDS Data2 Shield |
| Pin 3 | TMDS Data2− |
| Pin 4 | TMDS Data1+ |
| Pin 5 | TMDS Data1 Shield |
| Pin 6 | TMDS Data1− |
| Pin 7 | TMDS Data0+ |
| Pin 8 | TMDS Data0 Shield |
| Pin 9 | TMDS Data0− |
| Pin 10 | TMDS Clock+ |
| Pin 11 | TMDS Clock Shield |
| Pin 12 | TMDS Clock− |
| Pin 13 | CEC (Consumer Electronics Control) |
| Pin 14 | Reserved (HDMI 1.0-1.3a) Utility/HEAC+ (HDMI 1.4+, optional, HDMI Ethernet Channel and Audio Return Channel) |
| Pin 15 | SCL (I²C serial clock for Display Data Channel (DDC)) |
| Pin 16 | SDA (I²C serial data for DDC) |
| Pin 17 | Ground (for DDC, CEC, Audio Return Channel (ARC), and HDMI Ethernet Channel (HEC)) |
| Pin 18 | +5 V |
| Pin 19 | Hot Plug Detect (all versions) HEAC− (HDMI 1.4+, optional, HDMI Ethernet Channel and Audio Return Channel) |

In some embodiments, the at least one first pin includes at least one of SCL pin (or pin 15) and SDA pin (or pin 16), i.e., one or both of SCL pin and SDA pin.

In some embodiments, the at least one first communication signal is compliant with RS232 protocol.

The control unit 112 may be implemented by a microcontroller or any processing unit with configurable pins for communication usage.

In some embodiments, the control unit 112, or each of the first and second display devices correspondingly, configures the at least one first pin to be a UART TX/RX pin.

In some embodiments, the at least one first communication signal is compliant with I2C protocol.

In some embodiments, the control unit 112, or each of the first and second display devices correspondingly, configures the at least one first pin to be an I2C SDA/SCL pin.

In some embodiments, the at least one first communication signal is a transistor-transistor logic (TTL) signal for transmitting a high state or a low stage.

In some embodiments, the control unit 112, or each of the first and second display devices correspondingly, configures the at least one first pin to be a GPIO control pin.

In some embodiments, the at least one first communication signal is a PWM signal.

In some embodiments, the control unit 112, or each of the first and second display devices correspondingly, configures the at least one first pin to be a PWM control pin.

In some embodiments, the control unit 112, or each of the first and second display devices correspondingly, configures the at least one first pin to be a specific pin compliant with a protocol with which the at least one first communication signal is compliant.

In some embodiments, the control unit 112 or the first display device is further configured to transmit at least one second communication signal through at least one second pin (e.g., at least one of pin P as shown in FIG. 6, 7, or 8) of the connector 190 of the first display device to communicate with the second display device, wherein the at least one second communication signal is compliant with the digital display interface standard. In an implementation, the at least one second communication signal may include video and/or audio data signal or control signals compliant with the digital display interface standard.

In some embodiments, the control unit 112 or the first display device is operable in one of a first mode and a second mode selectively. The control unit 112 or the first display device in the first mode is configured so that the at least one first pin is compliant with the digital display interface standard. The control unit 112 or the first display device in the second mode is configured so that the at least one first pin transmits the at least one first communication signal.

In an exemplary implementation regarding the first and second modes, a DP standard is taken as the digital display interface standard and the pins 13 and 14 of the connector 190 are employed as the first pins of the connector 190. The first pins, such as the pins 13 and 14, of the connector 190 are electrically coupled to the pins CP1 and CP2 of the control unit 112, respectively, as illustrated in FIG. 7 or 8. The pins CP1 and CP2 of the control unit 112, which may be referred to as configurable pins, are capable of being configured as input or output pins for different signal formats (e.g., two, three, or more signal formats). In the first mode, the pins CP1 and CP2 are configured to be GPIO pins which are driven to the ground level for example so as to be compliant with the DP standard. In the second mode, the pins CP1 and CP2 are configured to be another type of pins which are intended to transmit and receive signals, respectively, so that at least one first communication signal can be transmitted which is non-standard with respect to the DP standard. In an example, the first mode may be executed when the display device is started up, and the second mode is then entered when the startup of the display device is completed, wherein a checking of whether the DP standard is compliant may be performed during the startup.

Figure 10:
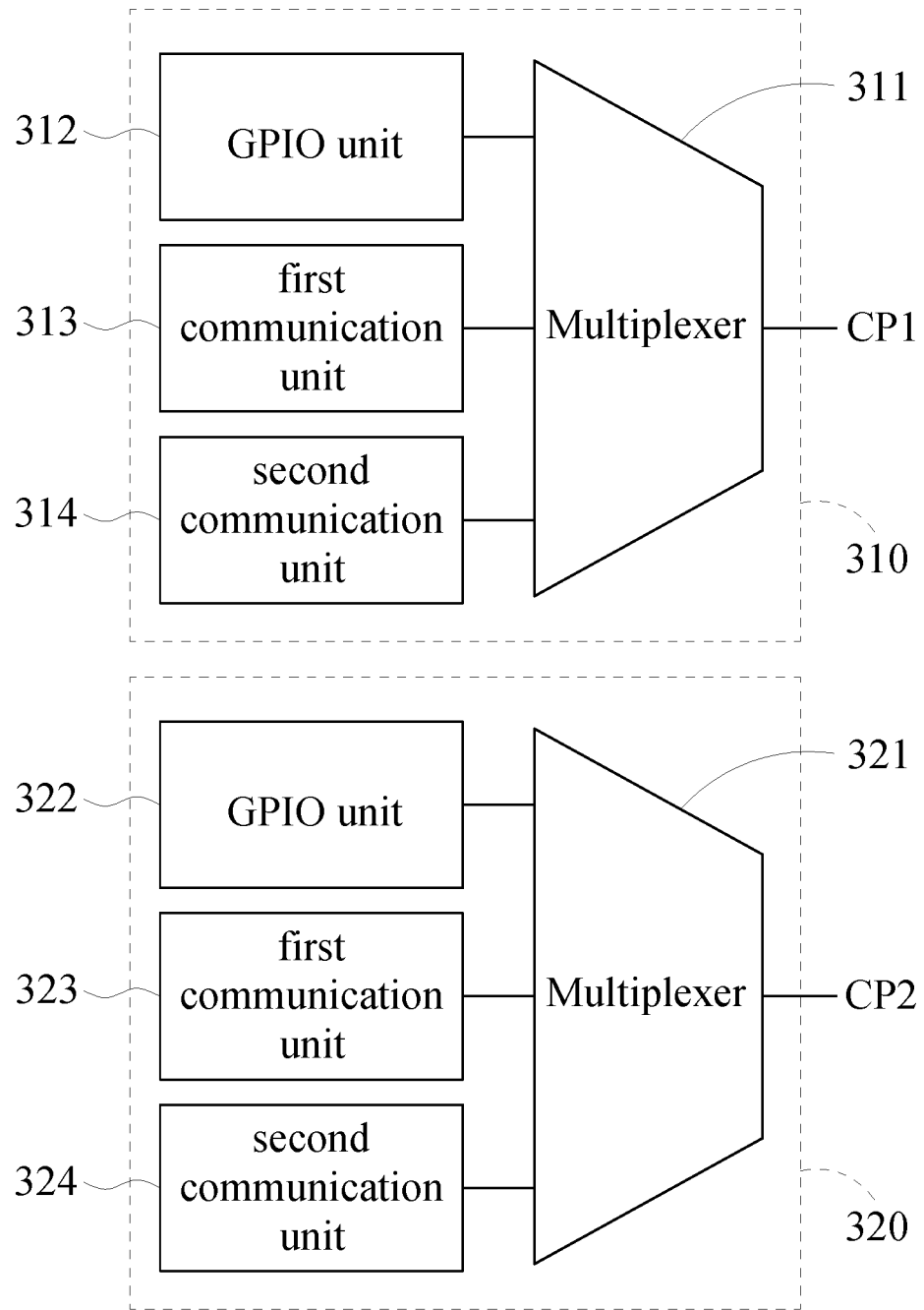
FIG. 10 is a block diagram illustrating an embodiment of data path configuration of the control unit.

FIG. 10 illustrates an embodiment of configurable data paths of the control unit 112 which can be utilized to realize the above exemplary implementation regarding the first and second modes. In FIG. 10, the control unit 112 includes pin configurable units 310 and 320 electrically coupled to the pins CP1 and CP2 respectively. The pin configurable unit 310 includes a multiplexer 311, a general-purpose input/output (GPIO) unit 312, a first communication unit 313, and a second communication unit 314. The pin configurable unit 320 includes a multiplexer 321, a GPIO unit 322, a first communication unit 323, and a second communication unit 324. For example, the first communication units 313 and 323 may be compliant with I2C protocol for SDA and SCL signaling, respectively. For example, the second communication units 314 and 324 may be compliant with a universal asynchronous receiver-transmitter (UART) protocol for transmission and receiver signaling, respectively. The pin CP1 (or CP2) can be configured to be one of the types of pin (such as GPIO, I2C, or UART) by triggering the multiplexer 311 (or 321) by way of at least one of software instruction or hardware signal.

The following provides some embodiments if two configurable pins (e.g., CP1 and CP2) of the control unit 112 are utilized at the same time.

In an embodiment, if a UART protocol, such as RS-232, is employed, the pins CP1 and CP2 can be configured as UART TX (transmitter) and RX (receiver) respectively so that the first display device can be communicated with the second device by way of the RS-232 protocol.

In another embodiment, if an I2C protocol is employed, the pins CP1 and CP2 can be configured as SDA and SCL of I2C respectively so that the first display device can be communicated with the second device by way of the I2C protocol.

In yet another embodiment, if a specific protocol is employed, the pins CP1 and CP2 can be configured as the bus of the specific protocol so that the first display device can be communicated with the second device by way of the specific protocol.

The following provides some embodiments if one configurable pin (e.g., CP, CP1 or CP2) of the control unit 112 is utilized individually.

In an embodiment, if a TTL signal for transmitting a high or low state is employed, the configurable pin can be configured as GPIO so that the first display device can be communicated with the second device by way of the TTL signal.

In another embodiment, if a pulse width modulation (PWM) signal is employed, the configurable pin can be configured as PWM so that the first display device can be communicated with the second device by way of the PWM signal.

In yet another embodiment, if a specific protocol is employed, the configurable pin can be configured according to the specific protocol so that the first display device can be communicated with the second device by way of the specific protocol.

Certainly, the implementation of the invention is not limited to the above examples. For instance, the digital display interface standard may be taken as another standard, such as HDMI or other digital interface, where appropriate. Likewise, the number of configurable pins may be taken or the protocol may be taken as any protocol, where appropriate.

In addition, in some daisy-chain applications, the display devices of the display communication system (such as FIG. 1 or 2) should be consistent regarding the configuration, for example, the setting of configurable pins of the control unit and/or the setting of the digital display interface standard, and such configuration can be implemented by way of the firmware of each display device storing such configuration. Certainly, the implementation of the display communication system is not limited to the above example.

In some embodiments, the control unit 112 or the first display device in the second mode is capable of transmitting the at least one first communication signal to the second display so as to control the second display.

In some embodiments, the at least one first communication signal indicates at least one of identification information, power state information, and setting for video input interface associated the first display device under a daisy chain application. For example, the display devices of a display communication system (such as FIG. 3) can be assigned with identification information (or called ID) as 01, 02, 03. If it is required to set a specific one of the display devices to a required power state (e.g., power on, off, sleep mode, or hibernation mode), a first communication signal may be generated to include the identification information indicating the specific display device and the power state information indicating the required power state. In some examples, the change of the input source interface (e.g., VGA, HDMI, or DP), or any system or display device related control functionality according to the requirement, may be implemented likewise.

Figure 11:
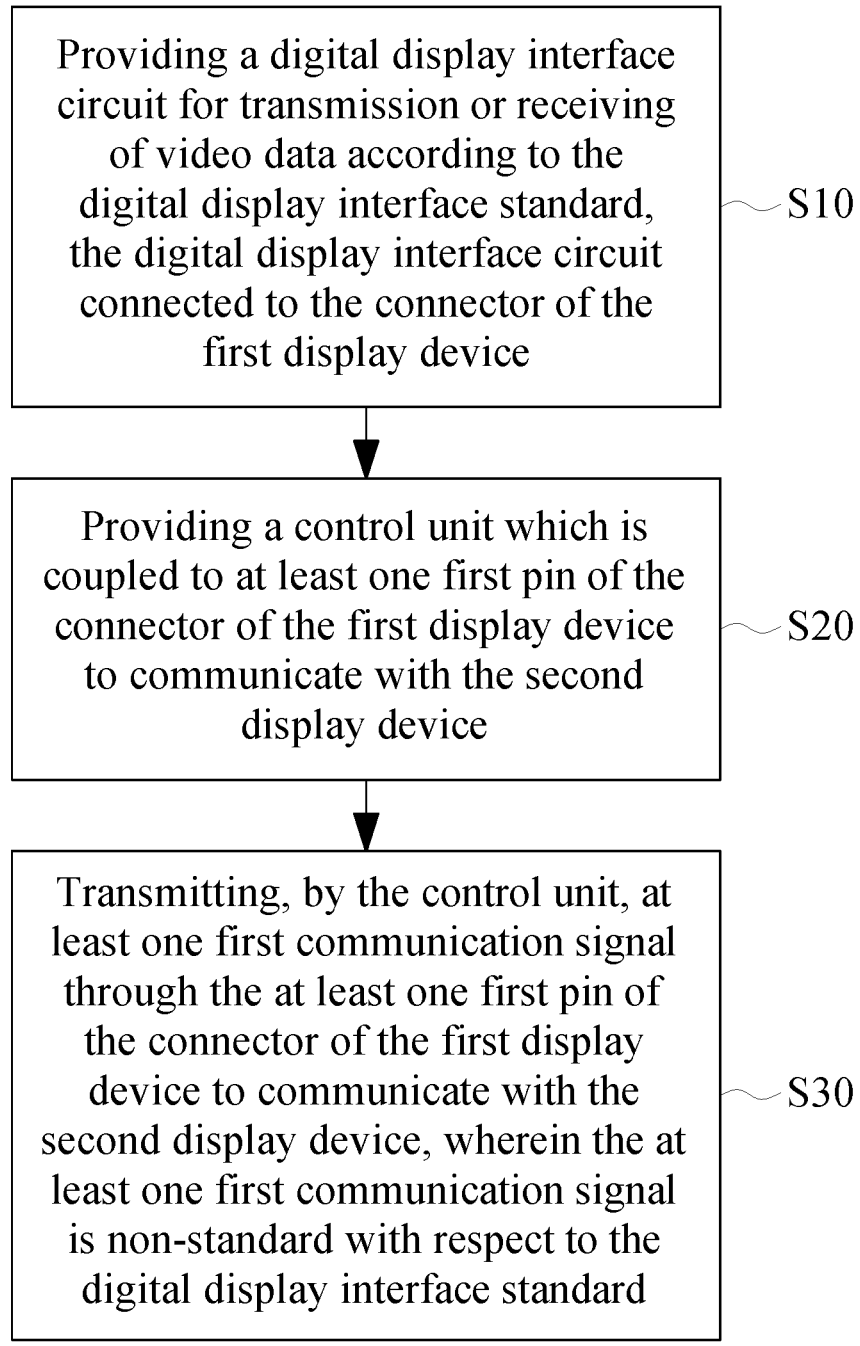
FIG. 11 is a flowchart illustrating an embodiment of a method for use in a first display device to facilitate communication with a second display device.

Referring to FIG. 11, a method for use in a first display device to facilitate communication with a second display device is illustrated according to an embodiment in a flowchart. The first display device and the second display device each including a connector compliant with a digital display interface standard.

In FIG. 11, the method includes the following steps S10-S30.

As shown in step S10, a digital display interface circuit is provided for transmission or receiving of video data according to the digital display interface standard, the digital display interface circuit connected to the connector of the first display device.

As shown in step S20, a control unit is provided which is coupled to at least one first pin of the connector of the first display device to communicate with the second display device.

As shown in step S30, at least one first communication signal is transmitted by the control unit through the at least one first pin of the connector of the first display device to communicate with the second display device, wherein the at least one first communication signal is non-standard with respect to the digital display interface standard.

In some embodiments, the method may be applied to any one of the above embodiments.

In an embodiment, the method of FIG. 11 may further include, before the step S30: configuring, by the control unit, the at least one first pin to be a specific pin compliant with a protocol with which the at least one first communication signal is compliant.

In an embodiment, the method of FIG. 11 may further include: transmitting, by the control unit, at least one second communication signal through at least one second pin of the connector of the first display device to communicate with the second display device, wherein the at least one second communication signal is compliant with the digital display interface standard.

While the present disclosure has been described by means of specific embodiments, numerous modifications and variations could be made thereto by those skilled in the art without departing from the scope and spirit of the present disclosure set forth in the claims.

What is claimed is:

1. A circuit for use in a first display device to facilitate communication with a second display device, the first display device and the second display device each including a corresponding connector compliant with a digital display interface standard, the circuit comprising:
   a digital display interface circuit for transmission or receiving of video data according to the digital display interface standard, the digital display interface circuit for being connected to the connector of the first display device; and
   a control unit being configured to transmit at least one first communication signal through at least one first pin of the connector of the first display device to communicate with the second display device through a cable compliant with the digital display interface standard to be connected between the connectors of the first display device and the second display device, wherein the at least one first communication signal is non-standard with respect to the digital display interface standard, and the control unit is a microcontroller-based or processing-unit-based circuit.

2. The circuit according to claim 1, wherein the digital display interface standard is a DisplayPort (DP) standard.

3. The circuit according to claim 2, wherein the at least one first pin comprises at least one of two pins which are for being connected to ground for the DP standard (CONFIG. 1, CONFIG. 2).

4. The circuit according to claim 1, wherein the digital display interface standard is a High Definition Multimedia Interface (HDMI) standard.

5. The circuit according to claim 1, wherein the at least one first pin comprises at least one of a serial clock (SCL) pin and a serial data (SDA) pin.

6. The circuit according to claim 1, wherein the at least one first communication signal is compliant with RS232 protocol.

7. The circuit according to claim 6, wherein the control unit configures the at least one first pin to be a transmitter/receiver (TX/RX) pin for universal asynchronous receiver-transmitter (UART) (UART TX/RX pin).

8. The circuit according to claim 1, wherein the at least one first communication signal is compliant with I2C protocol.

9. The circuit according to claim 8, wherein the control unit configures the at least one first pin to be an I2C SDA/SCL pin.

10. The circuit according to claim 1, wherein the at least one first communication signal is a transistor-transistor logic (TTL) signal for transmitting a high state or a low stage.

11. The circuit according to claim 10, wherein the control unit configures the at least one first pin to be a general-purpose input/output (GPIO) control pin.

12. The circuit according to claim 1, wherein the at least one first communication signal is a pulse width modulation (PWM) signal.

13. The circuit according to claim 12, wherein the control unit configures the at least one first pin to be a PWM control pin.

14. The circuit according to claim 1, wherein the control unit configures the at least one first pin to be a specific pin compliant with a protocol with which the at least one first communication signal is compliant.

15. The circuit according to claim 1, wherein the control unit is further configured to transmit at least one second communication signal through at least one second pin of the connector of the first display device to communicate with the second display device, wherein the at least one second communication signal is compliant with the digital display interface standard.

16. The circuit according to claim 1, wherein the control unit is operable in one of a first mode and a second mode selectively; the control unit in the first mode is configured so that the at least one first pin is compliant with the digital display interface standard; and the control unit in the second mode is configured so that the at least one first pin transmits the at least one first communication signal.

17. The circuit according to claim 16, wherein the control unit in the second mode is capable of transmitting the at least one first communication signal to the second display so as to control the second display.

18. The circuit according to claim 1, wherein the at least one first communication signal indicates at least one of identification information, power state information, and setting for video input interface associated the first display device under a daisy chain application.

19. A display communication system comprising:
a first display device having a first connector compliant with a digital display interface standard, and being configured to transmit a communication signal through at least one first pin of the first connector, wherein the at least one first communication signal is non-standard with respect to the digital display interface standard; and
a second display device having a second connector compliant with the digital display interface standard, and capable of being connected to the first display device through the second connector and through a cable compliant with the digital display interface standard to be connected between the first connector of the first display device and the second connector of the second display device, wherein the second display device is configured to receive the at least one first communication signal through at least one first pin of the second connector so as to communicate with the first display device.

20. The display communication system according to claim 19, wherein the digital display interface standard is a DisplayPort (DP) standard.

21. The display communication system according to claim 20, wherein the at least one first pin comprises at least one of two pins which are for being connected to ground for the DP standard (CONFIG. 1, CONFIG. 2).

22. The display communication system according to claim 19, wherein the digital display interface standard is a High Definition Multimedia Interface (HDMI) standard.

23. The display communication system according to claim 19, wherein the at least one first pin comprises at least one of a serial clock (SCL) pin and a serial data (SDA) pin.

24. The display communication system according to claim 19, wherein the at least one first communication signal is compliant with RS232 protocol.

25. The display communication system according to claim 24, wherein each of the first and second display devices correspondingly configures the at least one first pin to be a transmitter/receiver (TX/RX) pin for universal asynchronous receiver-transmitter (UART) (UART TX/RX pin).

26. The display communication system according to claim 19, wherein the at least one first communication signal is compliant with I2C protocol.

27. The display communication system according to claim 26, wherein each of the first and second display devices correspondingly configures the at least one first pin to be an I2C SDA/SCL pin.

28. The display communication system according to claim 19, wherein the at least one first communication signal is a transistor-transistor logic (TTL) signal for transmitting a high state or a low stage.

29. The display communication system according to claim 28, wherein each of the first and second display devices correspondingly configures the at least one first pin to be a general-purpose input/output (GPIO) control pin.

30. The display communication system according to claim 19, wherein the at least one first communication signal is a pulse width modulation (PWM) signal.

31. The display communication system according to claim 30, wherein each of the first and second display devices correspondingly configures the at least one first pin to be a PWM control pin.

32. The display communication system according to claim 19, wherein each of the first and second display devices correspondingly configures the at least one first pin to be a specific pin compliant with a protocol with which the at least one first communication signal is compliant.

33. The display communication system according to claim 19, wherein the first display device is further configured to transmit at least one second communication signal through at least one second pin of the connector of the first display device to communicate with the second display device, wherein the at least one second communication signal is compliant with the digital display interface standard.

34. The display communication system according to claim 19, wherein the first display device is operable in one of a first mode and a second mode selectively; the first display device in the first mode is configured so that the at least one first pin of the first connector is compliant with the digital display interface standard; and the first display device in the second mode is configured so that the at least one first pin of the first connector is employed to transmit the at least one first communication signal.

35. The display communication system according to claim 34, wherein the first display device is capable of transmitting the at least one first communication signal to the second display device so as to control the second display device.

36. The display communication system according to claim 19, wherein the at least one first communication signal indicates at least one of identification information, power state information, and setting for video input interface associated the first display device under a daisy chain application.

37. A method for use in a first display device to facilitate communication with a second display device, the first display device and the second display device each including a corresponding connector compliant with a digital display interface standard, the method comprising:
  (a) providing a digital display interface circuit for transmission or receiving of video data according to the digital display interface standard, the digital display interface circuit connected to the connector of the first display device;
  (b) providing a control unit which is coupled to at least one first pin of the connector of the first display device to communicate with the second display device, wherein the control unit is a microcontroller-based or processing-unit-based circuit; and
  (c) transmitting, by the control unit, at least one first communication signal through the at least one first pin of the connector of the first display device to communicate with the second display device through a cable compliant with the digital display interface standard to be connected between the connectors of the first display device and the second display device, wherein the at least one first communication signal is non-standard with respect to the digital display interface standard.

38. The method according to claim 37, wherein the method further comprises, before the step (c): configuring, by the control unit, the at least one first pin to be a specific pin compliant with a protocol with which the at least one first communication signal is compliant.

39. The method according to claim 37, wherein the method further comprises: transmitting, by the control unit, at least one second communication signal through at least one second pin of the connector of the first display device to communicate with the second display device, wherein the at least one second communication signal is compliant with the digital display interface standard.

40. The method according to claim 37, wherein the at least one first communication signal indicates at least one of identification information, power state information, and setting for video input interface associated the first display device under a daisy chain application.

\* \* \* \* \*